M. C. GORDON.
Churn.

No. 69,795.

Patented Oct. 15, 1867.

Witnesses

Inventor.
Micajah C. Gordon

United States Patent Office.

MICAJAH C. GORDON, OF KNIGHTSTOWN, INDIANA.

Letters Patent No. 69,795, dated October 15, 1867.

IMPROVEMENT IN CHURNS.

*The Schedule referred to in these Letters Patent and making part of the same.*

TO ALL WHOM IT MAY CONCERN:

Be it known that I, MICAJAH C. GORDON, of Knightstown, in Henry county, State of Indiana, have invented a new and useful Improvement in Churns; and I do hereby declare that the following is a full, clear, and exact description of the construction and operation of the same, reference being had to the annexed drawings, making a part of this specification, in which—

Figure 1:
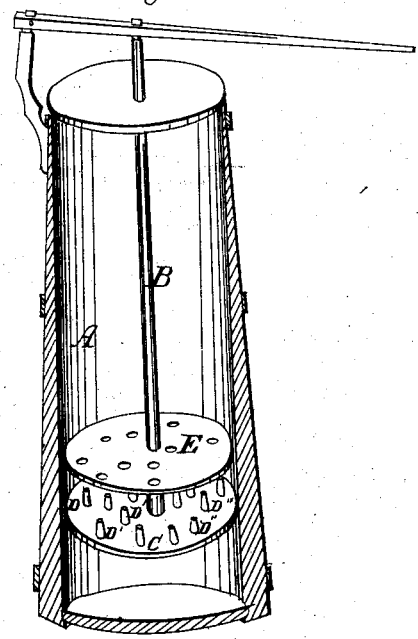

Figure 1 is a transverse sectional view, and

Figure 2:
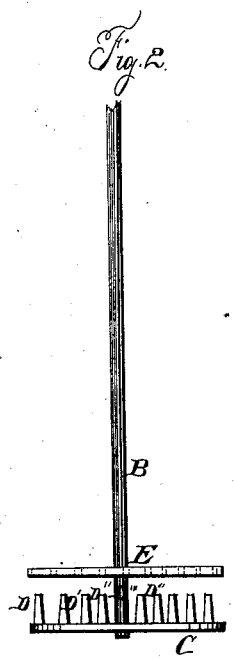

Figure 2 a detached view of the dash and breaker—

The same letters being used in each figure to represent identical parts.

A, fig. 1, is a churn, with uniform internal diameter; B, the dash-shaft, on which is the dash C, with tubes D D D, &c., inserted in it. E is the breaker, attached to shaft B, about four or five inches above dash C. The dash C is constructed of nearly the same size as the internal diameter of the churn, so as to work smoothly. In fig. 2, in dash C, are shown the tubes D D' D'', &c., dispersed over its surface. These tubes are two to four inches long, according to size of churn. Their diameter at the bottom is about one inch, and at the top about three-quarters of an inch. The number of tubes will vary according to size of churn, but should be as numerous as convenient, and may be made of metal or any other suitable material. E, fig. 2, is a breaker, in which holes are made to correspond with intervals between tubes D D, &c., so as to let the milk easily pass above or below the breaker.

The dash is operated by any of the usual modes, such as the lever, crank, &c., or by hand, and the milk being forced rapidly and forcibly through the tubes D D' D'', &c., is thrown in jets violently against the breaker E, and the globules or particles containing the butter are broken, and the separation and collection of the butter rapidly and thoroughly accomplished. The passage of the milk through these tubes D D, &c., gradually tapering, and consequently condensing the milk, and then violently forcing it up in columns, greatly facilitates this operation. This form of dash, tubes, and breaker may be used in any kind of receptacle of uniform diameter.

I do not claim anything on the receptacle or body of the churn, nor anything in regard to the mode of operating the dasher-shaft, but only as above set forth.

What I claim as my invention, and desire to secure by Letters Patent, is—

1. The dash C, with tubes D D' D'' D''', &c., fig. 2, with gradually-tapering diameters, by means of which dash and tubes the milk is forced upward in jets, and the globules containing the butter broken, and thereby the separation of the butter rapidly and effectually accomplished, substantially as and for the purposes set forth.

2. I claim the dash C, tubes D D' D'' D''', &c., fig. 2, in combination with breaker E, fig. 2, so arranged that the milk, when forced in jets through tubes D D' D'', &c., in dash C, is violently thrown against the breaker E, and the breaking of the globules or particles of milk and the separation of the butter therefrom are rapidly and effectually accomplished, substantially as and for the purposes set forth.

MICAJAH C. GORDON.

Witnesses:
R. M. GRUBBS,
CHAS. C. POWELL.